United States Patent
Sheidler et al.

(10) Patent No.: US 7,446,426 B2
(45) Date of Patent: Nov. 4, 2008

(54) SYSTEM AND METHOD FOR BOOSTING TORQUE OUTPUT OF A DRIVE TRAIN

(75) Inventors: Alan David Sheidler, Moline, IL (US); Brian Joseph Gilmore, Geneseo, IL (US); Mark Charles DePoorter, East Moline, IL (US); Peter Finamore, Weddington, NC (US); Duane Herbert Ziegler, Colona, IL (US); Joseph Albert Teijido, East Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/848,438

(22) Filed: Aug. 31, 2007

(65) Prior Publication Data

US 2008/0060858 A1    Mar. 13, 2008

Related U.S. Application Data

(62) Division of application No. 11/672,374, filed on Feb. 7, 2007, now Pat. No. 7,276,806.

(60) Provisional application No. 60/843,353, filed on Sep. 8, 2006.

(51) Int. Cl.
    *F02B 63/04* (2006.01)
(52) U.S. Cl. ............. 290/40 A; 290/40 B; 290/40 C; 290/40 R; 322/13; 322/11; 322/25; 322/37
(58) Field of Classification Search ............. 290/40 A, 290/40 B, 40 C, 40 R; 322/11, 13, 25, 37
    See application file for complete search history.

(56) References Cited

U.S. PATENT DOCUMENTS

| | | |
|---|---|---|
| 4,233,858 A | 11/1980 | Rowlett |
| 5,343,970 A | 9/1994 | Severinsky |
| 5,865,263 A | 2/1999 | Yamaguchi et al. |
| 6,338,391 B1 * | 1/2002 | Severinsky et al. ......... 180/65.2 |
| 6,367,570 B1 | 4/2002 | Long, III et al. |
| 6,394,208 B1 | 5/2002 | Hampo et al. |
| 6,441,506 B2 | 8/2002 | Nakashima |
| 6,450,274 B1 | 9/2002 | Konno et al. |
| 6,554,088 B2 | 4/2003 | Severinsky et al. |
| 6,777,904 B1 * | 8/2004 | Degner et al. ............... 318/609 |
| 6,800,953 B2 | 10/2004 | Blackburn et al. |
| 6,819,006 B2 | 11/2004 | Nakajima et al. |
| 6,853,893 B2 | 2/2005 | Corcione et al. |
| 6,962,050 B2 | 11/2005 | Hiraki et al. |

(Continued)

*Primary Examiner*—Darren Schuberg
*Assistant Examiner*—Iraj A Mohandesi

(57) ABSTRACT

An engine speed detector detects an engine speed of an engine having a baseline torque versus engine speed curve. A torque sensor detects an engine torque of the engine. A data processor determines if the detected engine speed is within a first speed range and if the detected engine torque is within a first torque range. A motor controller activates an electric motor to rotate substantially synchronously with a corresponding engine speed associated with the detected engine torque in an electric propulsion mode in accordance with a supplemental torque versus engine speed curve if the detected engine speed is within the first speed range and if the detected engine torque is within the first torque range. The supplemental torque versus engine speed curve intercepts the baseline torque versus engine speed curve at a lower speed point and a higher speed point.

10 Claims, 10 Drawing Sheets

U.S. PATENT DOCUMENTS

| | | |
|---|---|---|
| 7,021,409 B2 | 4/2006 | Tamor |
| 7,024,859 B2 | 4/2006 | Jayabalan et al. |
| 7,276,806 B1 * | 10/2007 | Sheidler et al. ........... 290/40 A |
| 2003/0102174 A1 | 6/2003 | Bordini |
| 2005/0178100 A1 | 8/2005 | Deppe |
| 2006/0020383 A1 | 1/2006 | Betz et al. |

* cited by examiner

SYSTEM AND METHOD FOR BOOSTING TORQUE OUTPUT OF A DRIVE TRAIN

This is a divisional of U.S. application Ser. No. 11/672,374, filed Feb. 7, 2007 now U.S. Pat. No. 7,276,806, which claims priority based on U.S. provisional Ser. No. 60/843,353, filed Sep. 8, 2006, under 35 U.S.C. 119(e).

FIELD OF THE INVENTION

This invention relates to a system and method for boosting torque output of a drive train, such as an internal combustion engine.

BACKGROUND OF THE INVENTION

In some industrial, construction, earth-moving, mining, agricultural, and other applications of drive trains, the engine load on an internal combustion engine may fluctuate. For example, the engine load on an internal combustion engine in a combine may increase as the vegetation density or yield increases in certain zones in a field. Although torque can be increased by turbo-charging or super-charging a naturally aspirated, internal combustion engine, there is typically a material lag associated with the torque increase. The material lag tends to make turbo-charging or super-charging ineffective in dealing with sudden or unexpected increases in engine load. Accordingly, there is a need to provide rapid or responsive boosting of torque of a drive train.

SUMMARY OF THE INVENTION

A system and method for boosting a torque output of a drive train comprises an engine speed detector and a torque sensor. The engine speed detector detects an engine speed of an engine having a baseline torque versus engine speed curve. The torque sensor detects an engine torque of the engine. A data processor determines if the detected engine speed is within a first speed range and if the detected engine torque is within a first torque range. A motor controller activates an electric motor to rotate substantially synchronously with a corresponding engine speed associated with the detected engine torque in an electric propulsion mode in accordance with a supplemental torque versus engine speed curve if the detected engine speed is within the first speed range and if the detected engine torque is within the first torque range. The supplemental torque versus engine speed curve intercepts the baseline torque versus engine speed curve at a lower speed point and a higher speed point.

DESCRIPTION OF PREFERRED EMBODIMENTS

Figure 1:
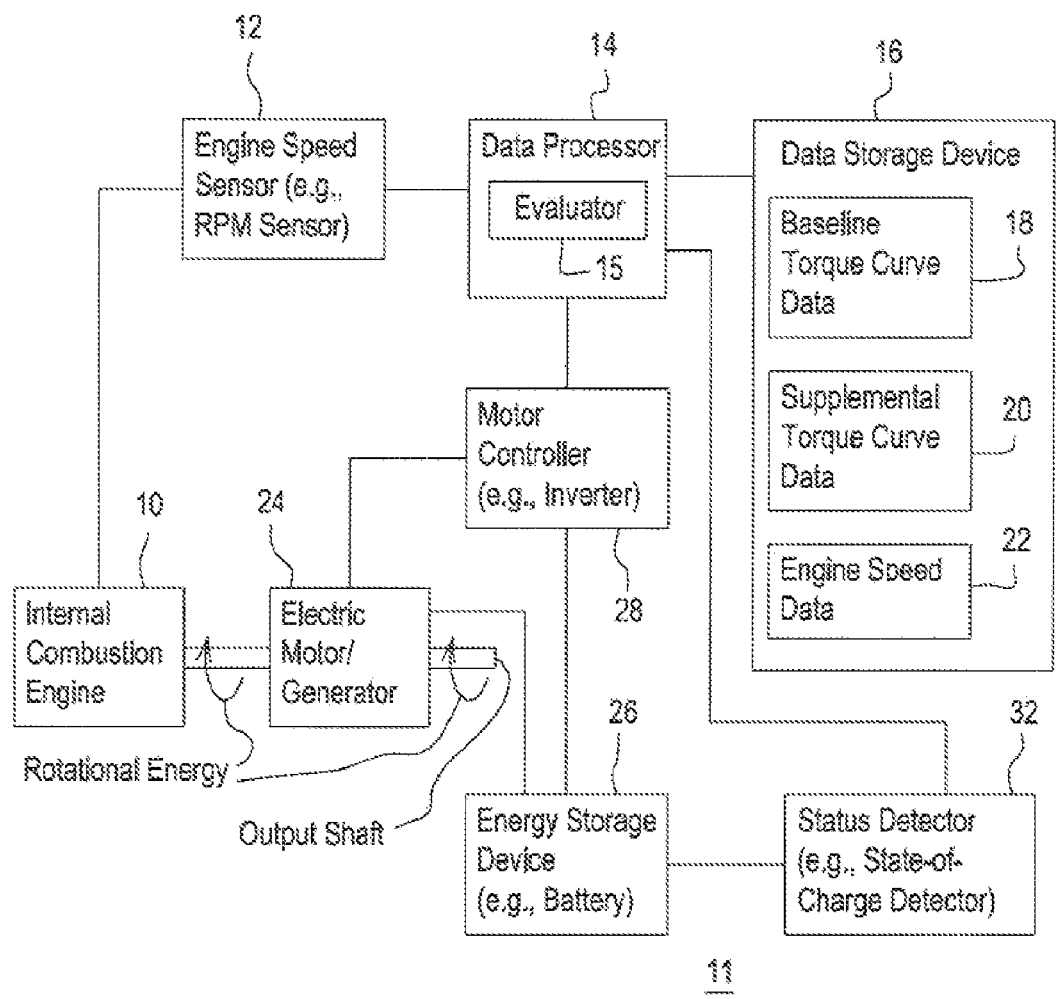
FIG. 1 is a block diagram of one embodiment of system for boosting torque output of a drive train.

In accordance with one embodiment, FIG. 1 illustrates a system 11 for boosting torque output of a drive train. The system 11 comprises an internal combustion engine 10 mechanically coupled to an electric motor/generator 24. In turn, the output (e.g., output shaft) of the electric motor/generator 24 provides rotational energy for propelling the vehicle, operating implements, or both. The electric motor/generator 24 is coupled electrically, directly or indirectly, to the energy storage device 26, the motor controller 28, or both. The motor controller 28 is coupled to the energy storage device 26.

An engine speed sensor 12 (e.g., revolution per minute (RPM) sensor) is associated with the internal combustion engine 10. The output of the engine speed sensor 12 is provided directly or indirectly to the data processor 14. If the engine speed sensor 12 provides an analog output signal, an analog-to-digital (A/D) converter may be interposed between the engine speed sensor 12 and the data processor 14.

The data processor 14 communicates with one or more of the following devices: a data storage device 16, the engine speed sensor 12, the motor controller 28, and the status detector 32. The lines interconnecting the foregoing devices with the data processor 14 may represent one or more logical data paths, physical data paths, or both. For example, the interconnections may be realized as a databus. The data storage device 16 facilitates storage and retrieval of data, such as base torque curve data 18, supplemental torque curve data 20, and engine speed data 22. In one embodiment, the data processor 14 comprises an evaluator 15 for determining if the engine is operating with a defined speed range (e.g., a first speed range), a defined torque range, or both, among other things.

The internal combustion engine 10 may comprise any engine, regardless of whether it is naturally aspirated, turbo-charged, or supercharged. The engine speed sensor 12 may be associated with an output shaft (e.g., crankshaft) of the engine 10 for detecting a rotational velocity or speed in revolutions per unit time (e.g., revolutions per minute). For example, the engine speed sensor 12 may comprise an electromagnetic sensor (e.g., magnetostrictive transducer, magnetoresistive sensor, or Hall Effect sensor) to detect a magnetic field of a magnet or other magnetic structure associated with or rotating with the output shaft.

The electric motor/generator 24 may operate in at least two modes: an electric propulsion mode and a power generation mode. In the electric propulsion mode, the electric motor/generator 24 acts as a motor. For example, in the electric propulsion mode the electric motor/generator 24 may drive or rotate the output shaft of the engine 10. The electric propulsion mode may comprise any mode in which the vehicle is propelled by the electric motor/generator 24, or another electric motor, either alone or together with the engine 10. Where both an electric motor and the engine 10 are active and propel the vehicle, the electric propulsion mode may be referred to as an electrically assisted mode. Accordingly, in the electric propulsion mode or the electrically assisted mode, the moving internal components of the engine 10 may present a load (e.g., a dynamic load) to the electric motor/generator 24. The motor torque of the electric motor (e.g., electric motor/generator 24) may meet or exceed the engine torque of the engine 10 in the electrically assisted mode.

In the power generation mode, the electric motor/generator 24 acts as a generator. For example, in the power generation mode the engine 10 may drive the electric motor/generator 24. In the power generation mode, the vehicle may not be propelled by the electric/motor generator 24, but could be propelled by another electric motor other than the electric motor/generator 24, the engine 10, or both.

In one embodiment, the electric motor/generator 24 may be associated with or integrated into the flywheel assembly of the internal combustion engine 10. For example, the rotor of the electric motor/generator 24 may be coupled to the output shaft of the engine 10 for rotation therewith, whereas the stator is axially or radially separated from the rotor. Because the rotor rotates at substantially the same speed as the output shaft of the engine 10, the transition between the engine propulsion mode and electrically assisted mode does not necessarily require any clutch assembly or transmission to couple the output shaft of the engine 10 and the output shaft of the electric motor/generator 24. However, such a clutch assembly may be used where the electric motor/generator 24 is not integrated into the flywheel assembly or to facilitate matching the engine torque of the output shaft of the engine 10 to the motor torque of the output shaft of the electric motor/generator 24.

In one configuration, the electric motor/generator 24 may comprise a direct current (DC) motor and a direct current (DC) generator.

In an alternative embodiment, the electric motor/generator 24 may comprise an alternating current (AC) motor/alternator that consumes and generates alternating current. If the electric motor/generator 24 or generator produces alternating current, a rectifier (e.g., full wave bridge rectifier or diode circuit) may be positioned between the electric motor/generator 24 and the energy storage device 26.

The motor controller 28 (e.g., inverter or variable voltage source) is capable of providing a motor control signal to the electric motor/generator 24. The motor control signal may be used to control any of the following: motor rotational speed, motor torque, motor rotational direction, motor active or inactive status, and motor duty cycle. If the electric motor/generator 24 is an alternating current configuration, the motor controller 28 may comprise an inverter that converts direct current electric energy from the energy storage device 26 into alternating current. The inverter may comprise a chopper circuit, a switching circuit, or a variable frequency oscillator for controlling the frequency, phase, or pulse duration of the motor control signal to regulate or adjust an electric motor speed of the electric motor/generator 24. However, if the electric motor/generator 24 is a direct current configuration, the motor controller 28 may comprise a variable voltage source. The variable voltage source controls the voltage level or current level of the control signal to regulate or adjust an electric motor speed of the electric motor/generator 24.

The energy storage device 26 may comprise a battery, an ultra-capacitor, a network of capacitors, a combination of the foregoing devices, or another storage device. The energy storage device 26 receives and stores electrical energy generated by the electric motor/generator 24 in a power generation mode. The energy storage device 26 supplies stored electrical energy to the motor controller 28, the electric motor/generator 24, or both in an electric propulsion mode or an electrically assisted mode.

The data processor 14 may comprise a microcontroller, a microprocessor, a digital signal processor, a programmable logic array, a logic device, or another device for processing data (e.g., sensor data provided by the engine speed sensor 12, the status detector 32, or the torque sensor 30). The data processor 14 may be associated with data storage and retrieval software or instructions for retrieving or accessing reference data stored in the data storage device 16. In one embodiment, the data processor 14 comprises an evaluator 15 for evaluating or comparing engine speed data, engine torque data, energy storage status data (e.g., state-of-charge data), or other sensor data to reference data stored in the data storage device 16. The reference data may comprise baseline torque curve data 18, supplemental torque curve data 20, and engine speed data 22, for example.

The status detector 32 comprises a system for monitoring the energy storage status or state of charge (SOC) of the energy storage device 26 (e.g., battery). The status detector 32 may comprise one or more of the following components: a data processing device (e.g., microcontroller) or logic device, an ammeter or current meter, a volt meter, a thermometer, and a clock. The SOC represents the remaining capacity of a battery or electrical storage device in a charge/discharge cycle. The SOC may be expressed as the ratio of the remaining capacity to the full charge capacity of a cycle-aged battery. In one embodiment, the SOC of the electrical storage device may be estimated by measuring current drain and voltage levels at regular time intervals. In another embodiment, the SOC may be based on a battery model that takes into account one or more of the following: charging voltage, charging time, charging temperature, discharge rate, discharge temperature, charge recovery, cycle aging, electrochemical composition factors, and an electrical equivalent circuit. The state-of-charge data may be time-stamped or associated with a temporal indicator.

Figure 2:
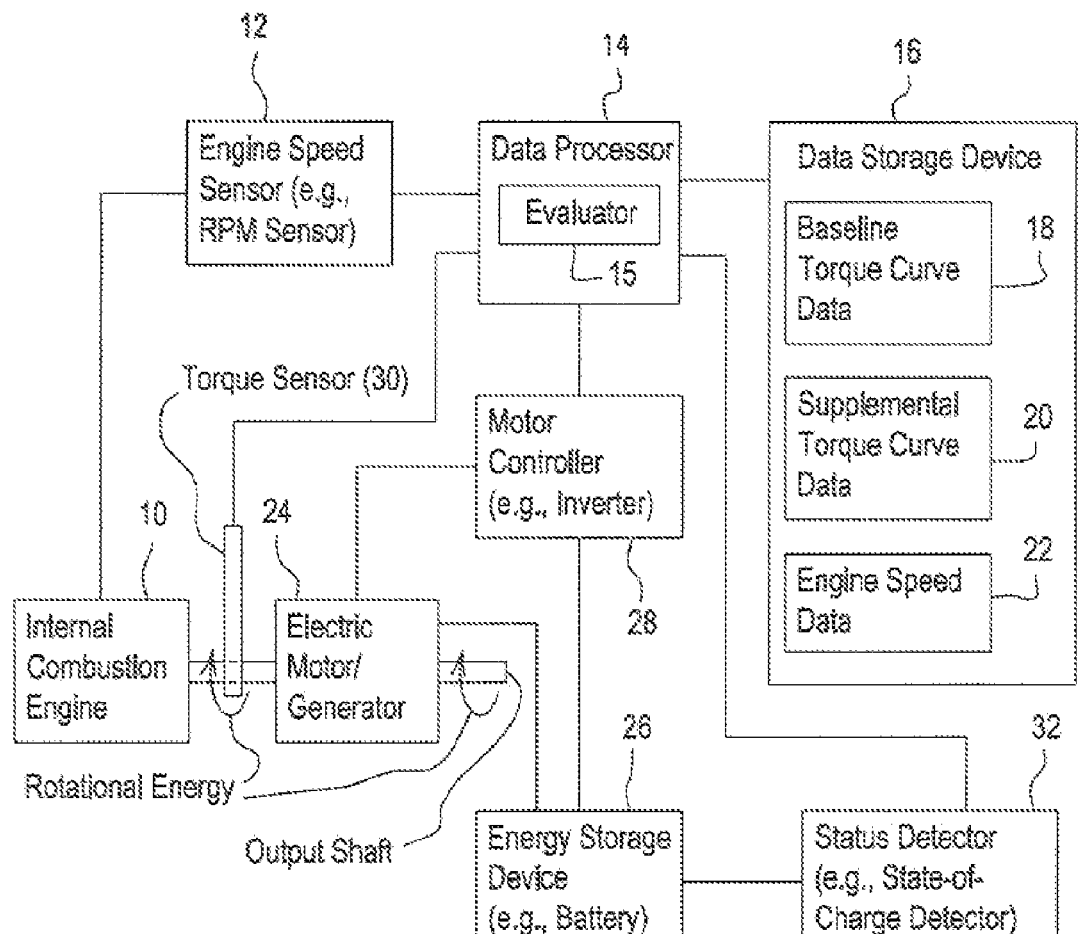
FIG. 2 is a block diagram of another embodiment of a system for boosting torque output of a drive train.

The system 111 of FIG. 2 is similar to the system 11 of FIG. 1, except the system 11 of FIG. 2 further includes a torque sensor 30 that communicates with the data processor 14. The torque sensor 30 measures a torque associated with an output shaft of the internal combustion engine 10. The torque sensor 30 comprises a torque transducer, a strain gauge, a piezoelectric sensor, a piezoresistive sensor, or another transducer or device for converting mechanical force (e.g., torsion) into electrical energy, mechanical force into electrical resistance, or mechanical force into another electrical property that varies with the applied mechanical force. In one configuration, the torque sensor 30 may comprise an in-line rotary torque transducer that senses torque within a desired range for the internal combustion engine 10. For example, for a combine the transducer may be capable of sensing torque from approximately 1,000 Newton meters to approximately 3000 Newton meters, although the actual range will depend upon the particular application and the torque output of the internal combustion engine 10.

The torque sensor output may represent a sensed torque reading versus time, which is continuously or periodically sent from the torque sensor 30 to the data processor 14 for processing. If the torque sensor 30 provides an analog output, an analog-to-digital (A/D) converter may be interposed between the torque sensor 30 and the data processor 14. The analog-to-digital (A/D) converter converts the analog signal (of the torque sensor output) to a digital signal suitable for processing by the data processor 14.

Figure 3:
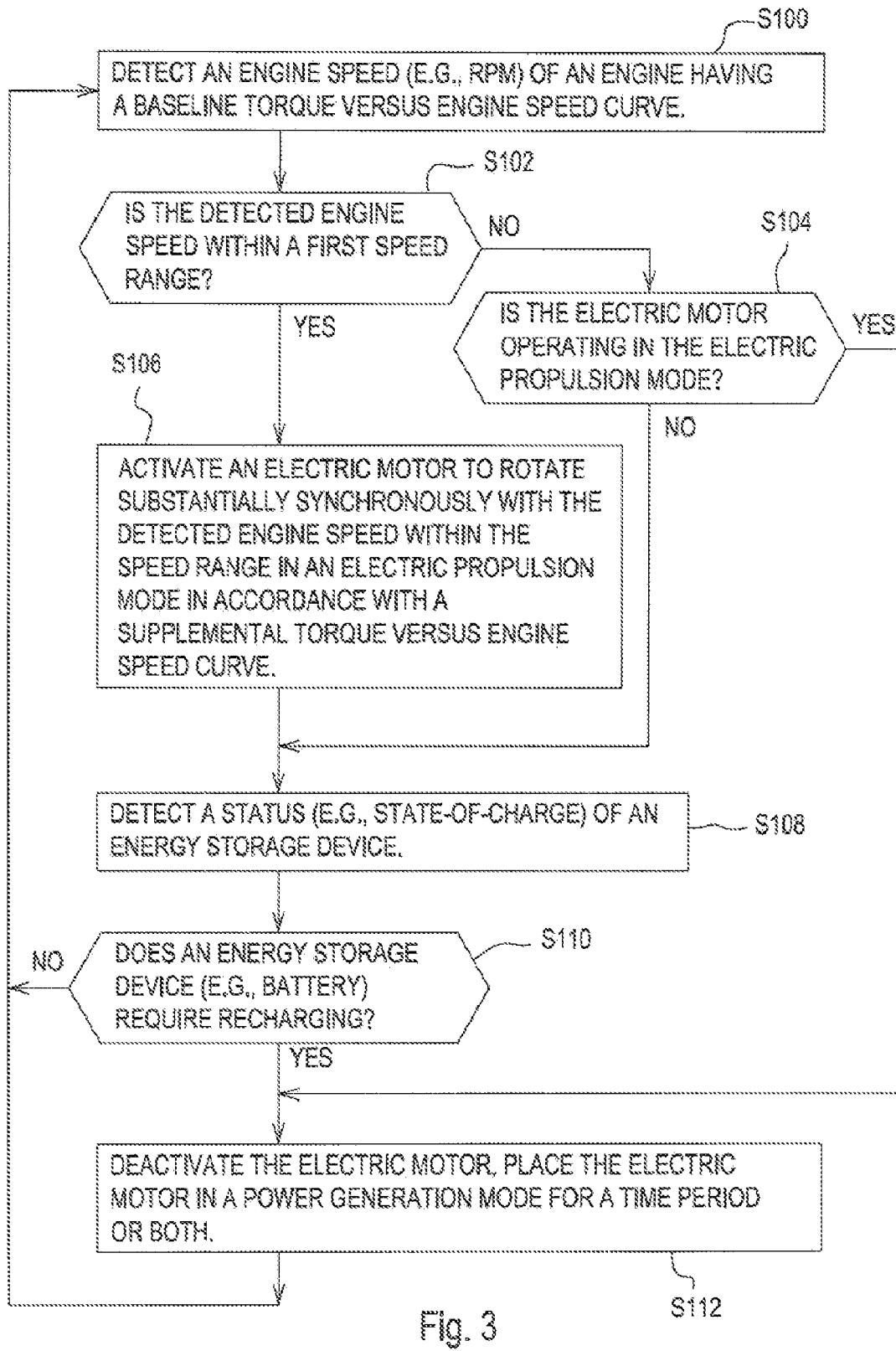
FIG. 3 is a flow chart of a first embodiment of a method for boosting torque output of a drive train.

FIG. 3 illustrates a method for boosting the torque of an engine 10 in accordance with the invention. The method of FIG. 3 begins in step S100.

In step S100, an engine speed sensor 12 detects an engine speed (e.g., revolutions per unit time or revolutions per minute (RPM)) of an output shaft (e.g., crankshaft) of an engine 10 having a baseline torque versus engine speed curve. For example, the baseline torque versus engine speed curve may represent that of a naturally aspirated engine, a turbocharged engine, a supercharged engine, or another engine that operates without any assistance of an electric motor (e.g., the electric motor/generator 24 is inactive).

In step S102, the data processor 14 determines whether the detected engine speed is within a first speed range. If the detected engine speed is within the first speed range, the method continues with step S106. However, if the detected engine speed is not within the first speed range, the method continues with step S104.

In step S104, the data processor 14 or motor controller 28 indicates whether the electric motor/generator 24 is operating in the electric propulsion mode (e.g., electrically assisted mode). If the electric motor/generator 24 is operating in the electric propulsion mode, the method continues with step S112. The electric propulsion mode may comprise any mode in which the vehicle is propelled by an electric motor (e.g., electric motor/generator 24), alone or together with the engine 10. However, if the electric motor is not operating in the electric propulsion mode, the method continues with step S108.

Figure 9:
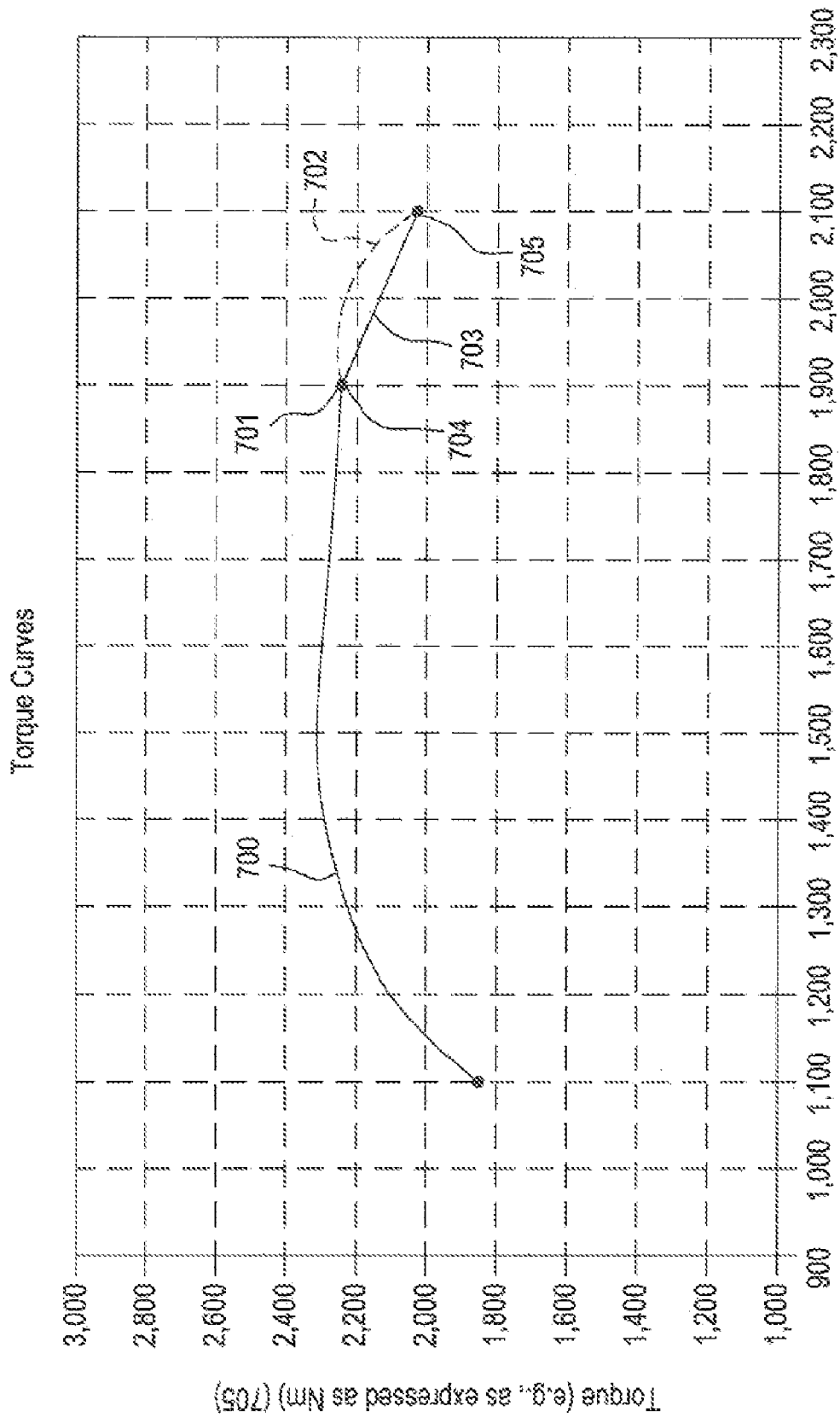
FIG. 9 is a diagram of a baseline torque curve and a supplemental torque curve.

In step S106, the data processor 14, the motor controller 28, or both activate an electric motor/generator 24 to rotate substantially synchronously with the detected engine speed within the first speed range in an electric propulsion mode (e.g., an electrically assisted mode) in accordance with a supplemental torque versus engine speed curve (e.g., a first supplemental torque versus engine speed curve 702 of FIG. 9).

The supplemental torque versus engine speed curve is produced when the electric motor/generator 24 assists the engine by providing a motor speed that substantially matches the engine speed and a motor torque that meets or exceeds the engine torque.

The supplemental torque versus engine speed curve may be carried out in accordance with various techniques that may be applied alternatively or cumulatively. Under a first technique, the supplemental torque versus engine speed curve may be generally parabolic and has an enhanced peak torque between a lower engine speed point (e.g., lower speed point) and a higher engine speed point (e.g., higher speed point) that intercept the baseline torque versus engine speed curve. The supplemental torque versus engine speed curve intercepts the baseline torque versus engine speed curve at a lower engine speed point and a higher engine speed point. The motor controller 28 makes a generally smooth transition between the baseline torque curve and the supplemental torque curve at the lower engine speed point, the upper engine speed point, or both.

Under a second technique, the motor controller 28, the data processor 14, or both may prohibit transitions between the baseline torque curve and the supplemental torque curve other than at the lower engine speed point and the higher engine speed point to prevent material mismatches in torque and/or speed between the electric motor/generator 24 and the engine 10.

Under a third technique, the supplemental torque versus engine speed curve may exceed the baseline torque at any engine speed between a lower engine speed point and an upper engine speed point.

Under a fourth technique, the supplement torque versus engine speed curve may comprise multiple supplemental torque versus engine speed curves that are positioned in an overlapping series or non-overlapping series along the baseline torque curve. Each of the supplemental torque versus engine speed curves may intercept the baseline torque curve at a distinct lower engine speed point and an upper engine speed point. The lower and higher speed points may be separated by regular intervals along the baseline torque curve, for instance.

In step S108, a status detector 32 (e.g., state-of-charge detector) detects an energy storage status (e.g., state-of-charge (SOC)) of the energy storage device 26. For example, when the status detector 32 may determine if the energy storage device 26 is fully charged, discharged, or in an intermediate state of charge. The intermediate state of charge may require recharging if it falls below a certain threshold ratio or percentage of a full charge.

In step S110, the data processor 14 of the status detector 32 determines whether or not an energy storage device 26 (e.g., battery) requires recharging based on the detected energy storage status (e.g., SOC). For example, the energy storage device 26 may require recharging if it falls below a certain threshold ratio or percentage of a full charge. If the energy storage device 26 requires recharging, the method continues with step S112. However, if the energy storage device 26 does not require recharging, the method returns to step S100.

In step S112, the motor controller 28 or the data processor 14 deactivates the electric motor of the electric motor/generator 24, places the electric motor of the electric motor/generator 24 in a power generation mode for a time period, or both. In other words, the motor controller 28 or the data processor 14(*a*) deactivates electric propulsion mode or the electrically assisted mode, or (b) places the generator of the electric/motor generator 24 into a power generation mode. The electric motor/generator 24 may be deactivated to prevent further discharging of the energy storage device 26, for example. In the power generation mode, the generator of the electric motor/generator 24 is active and converts mechanical rotational energy into electrical energy. In general, the electric motor/generator 24 may not generate electrical energy at the same time it functions as an electric motor.

Figure 4:
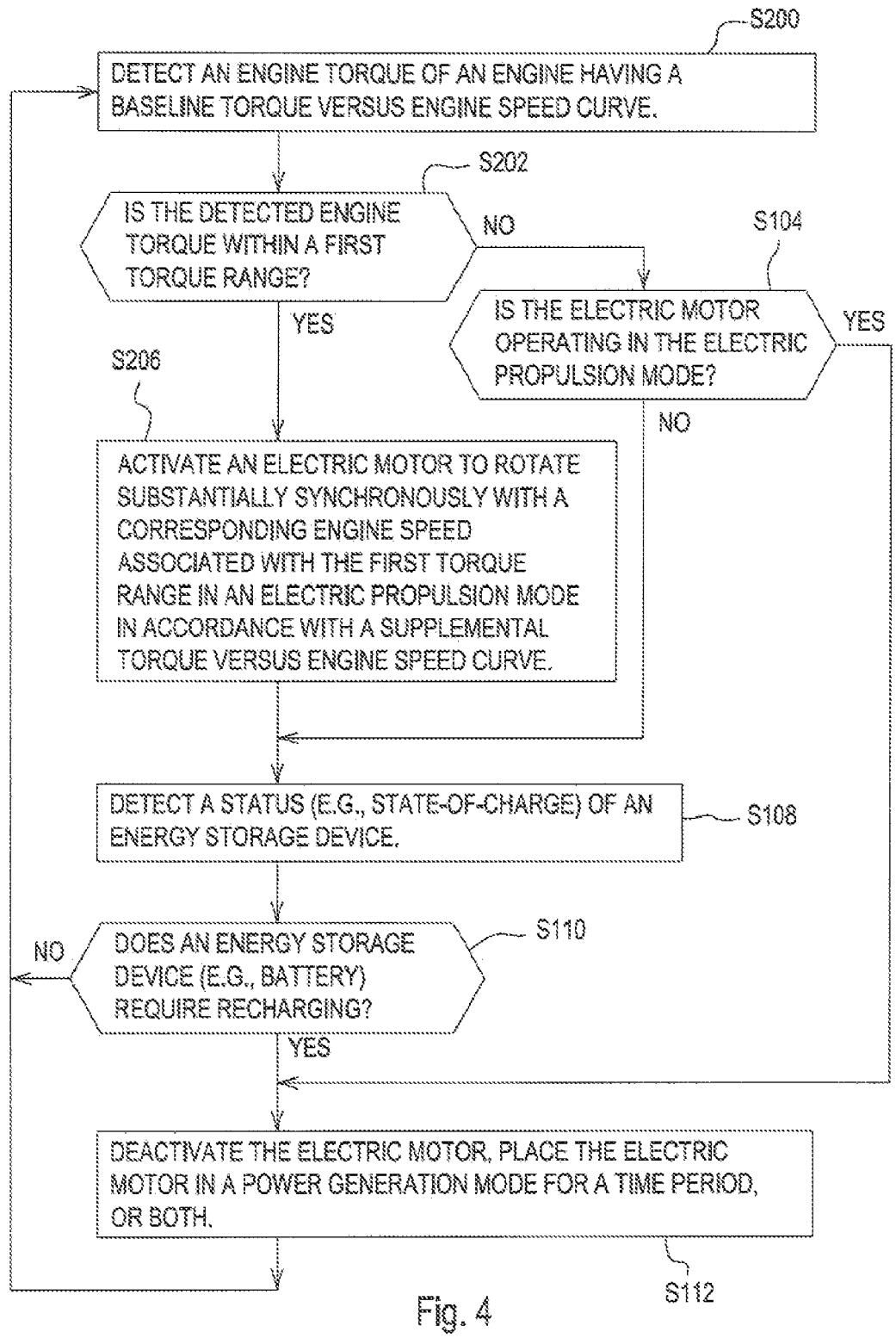
FIG. 4 is a flow chart of a second embodiment of a method for boosting torque output of a drive train.

The method of FIG. 4 is similar to the method of FIG. 3, except the method of FIG. 4 focuses on torque detection, as opposed to speed detection. Further, the method of FIG. 4 replaces step S100, step S102, and step S106, with step S200, S202, and S206, respectively. Like reference numbers in FIG. 3 and FIG. 4 indicate like steps or procedures.

In step S200, a torque sensor 30 detects an engine torque of an engine 10 having a baseline torque versus engine speed curve. In one embodiment, the torque sensor 30 measures engine torque when the electric motor/generator 24 or evaluator 15 is not active as an electric motor. Accordingly, the data processor 14 or motor controller 28 may deactivate (e.g., switch off) the electric motor of the electric motor/generator 24 in preparation for torque sensor measurements of the torque sensor 30 to ensure accurate measurement of engine torque for the internal combustion propulsion mode.

In another embodiment, the torque sensor 30 measures engine torque when the electric motor/generator 24 or evaluator 15 is active as an electric motor in the electrically assisted propulsion mode to eliminate any disruption of the torque boost attendant with the electrically assisted propulsion mode. Accordingly, rather than deactivate the electric motor of the electric motor/generator 24, the torque sensor 30 or the data processor 14 subtracts the torque gain from the electric motor/generator 24 at the applicable operating point (e.g., speed point and corresponding torque point associated with a torque curve). For example, the data processor 14 may subtract the torque difference between the supplemental torque curve data and the baseline torque curve data at the applicable operating point to determine the engine torque of the engine 10.

In step S202, the data processor 14 determines whether the detected engine torque is within a first torque range. If the detected engine torque is within a first torque range, the method continues with step S206. However, if the detected engine torque is not within the first range, the method continues with step S104.

In step S104, the data processor 14 or motor controller 28 indicates whether the electric motor/generator 24 is operating in the electric propulsion mode. If the electric motor/generator 24 is operating in the electric propulsion mode, the method continues with step S112. However, if the electric motor/generator 24 is not operating in the electric propulsion mode, the method continues with step S108.

In step S206, a data processor 14 or motor controller 28 activates the electric motor/generator 24 to rotate substantially synchronously with a corresponding engine speed associated with the detected engine torque within the first torque range in an electric propulsion mode in accordance with a supplemental torque versus engine speed curve (e.g., a first supplemental torque versus engine speed curve 702 of FIG. 9).

In step S108, a status detector 32 (e.g., state-of-charge detector) detects a status (e.g., state-of-charge (SOC)) of the energy storage device 26. For example, when the status detector 32 may determine if the energy storage device 26 is fully charged, discharged, or in an intermediate state of charge. The intermediate state of charge may require recharging if it falls below a certain threshold ratio or percentage of a full charge.

In step S110, the data processor 14 of the status detector 32 determines whether or not an energy storage device 26 (e.g., battery) requires recharging. For example, the energy storage device 26 may require recharging if it falls below a certain threshold ratio or percentage of a full charge. If the energy storage device 26 requires recharging, the method continues with step S112. However, if the energy storage device 26 does not require recharging, the method returns to step S100.

In step S112, the motor controller 28 or the data processor 14 deactivates the electric motor of the electric motor/generator 24, places the electric motor of the electric motor/generator 24 in a power generation mode for a time period, or both. In other words, the motor controller 28 or the data processor 14(*a*) deactivates electric propulsion mode or the electrically assisted mode, or (b) places the generator of the electric/motor generator 24 into a power generation mode. The electric motor/generator 24 may be deactivated to prevent further discharging of the energy storage device 26, for example. In the power generation mode, the generator of the electric motor/generator 24 is active and converts mechanical rotational energy into electrical energy. In general, the electric motor/generator 24 may not generate electrical energy at the same time it functions as an electric motor.

Figure 5:
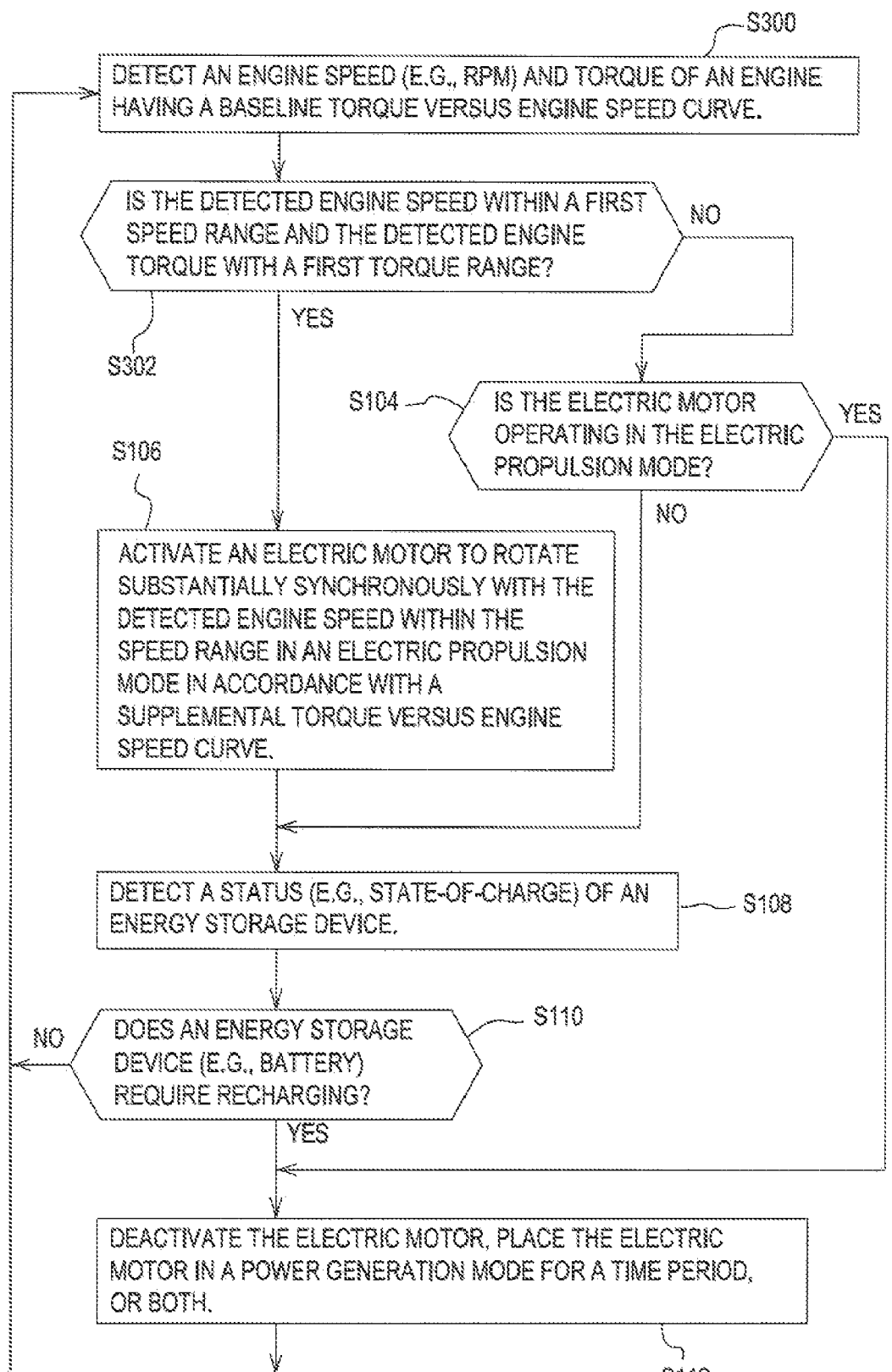
FIG. 5 is a flow chart of a third embodiment of a method for boosting torque output of a drive train.

The method of FIG. 5 is similar to the method of FIG. 3, except the method of FIG. 5 replaces step S100 and S102, with step S300 and S302. Like reference numbers in FIG. 3 and FIG. 5 indicate like steps or procedures.

In step S300, an engine speed sensor 12 detects an engine speed (e.g., revolutions per unit time or RPM) and torque sensor 30 detects an engine torque of an engine 10 having a baseline torque versus engine speed curve. For example, the engine speed and the torque may be detected substantially simultaneously and associated with one or more points or regions of the baseline torque versus engine speed curve.

In one embodiment, the torque sensor 30 detects the engine torque when the vehicle is not operating in an electrically assisted propulsion mode or when the electric motor is in an inactive state. Otherwise, the torque sensor 30 might be affected by torque contributions of the electric motor to the aggregate torque output of certain hybrid configurations.

In another embodiment, the torque sensor 30 detects the engine torque when the vehicle is operating in an electrically assisted propulsion mode, and the data processor 14 or torque sensor 30 compensates for the added torque associated with any applicable supplemental torque versus engine speed curve at the relevant operating point.

In step S302, the data processor 14 or motor controller 28 determines if the detected engine speed of the engine 10 is within a first speed range and if the detected engine torque (e.g., torque contribution to aggregate torque of the engine 10 plus the electric motor/generator 24) of the engine 10 is within a first torque range. If the detected engine speed is within a first speed range and if the detected engine torque is within a first torque range, the method continues with step S106. However, if the detected engine speed is not within a first range or if the detected engine torque is not within a first torque range, the method continues with step S104.

In step S104, the data processor 14 or motor controller 28 indicates whether the electric motor (of the electric/motor generator 24) is operating in the electric propulsion mode (e.g., electrically assisted propulsion mode). If the electric motor (of the electric/motor generator 24) is operating in the electric propulsion mode, the method continues with step S112. However, if the electric motor (of the electric/motor generator 24) is not operating in the electric propulsion mode (e.g., electrically assisted propulsion mode), the method continues with step S108.

In step S106, the data processor 14, the motor controller 28, or both activate an electric motor (of the electric motor/generator 24) to rotate substantially synchronously with the detected engine speed within the speed range in an electric propulsion mode in accordance with a supplemental torque versus engine speed curve.

In step S108, a status detector 32 (e.g., state-of-charge detector) detects a status (e.g., state-of-charge (SOC)) of the energy storage device 26. For example, when the status detector 32 may determine if the energy storage device 26 is fully charged, discharged, or in an intermediate state of charge. The intermediate state of charge may require recharging if it falls below a certain threshold ratio or percentage of a full charge.

In step S110, the data processor 14 of the status detector 32 determines whether or not an energy storage device 26 (e.g., battery) requires recharging. For example, the energy storage device 26 may require recharging if it falls below a certain threshold ratio or percentage of a full charge. If the energy storage device 26 requires recharging, the method continues with step S112. However, if the energy storage device 26 does not require recharging, the method returns to step S100.

In step S112, the motor controller 28 or the data processor 14 deactivates the electric motor of the electric motor/generator 24, places the electric motor of the electric motor/generator 24 in a power generation mode for a time period, or both. In other words, the motor controller 28 or the data processor 14(*a*) deactivates electric propulsion mode or the electrically assisted mode, or (b) places the generator of the electric/motor generator 24 into a power generation mode. The electric motor/generator 24 may be deactivated to prevent further discharging of the energy storage device 26, for example. In the power generation mode, the generator of the electric motor/generator 24 is active and converts mechanical rotational energy into electrical energy. In general, the electric motor/generator 24 may not generate electrical energy at the same time it functions as an electric motor.

Figure 6:
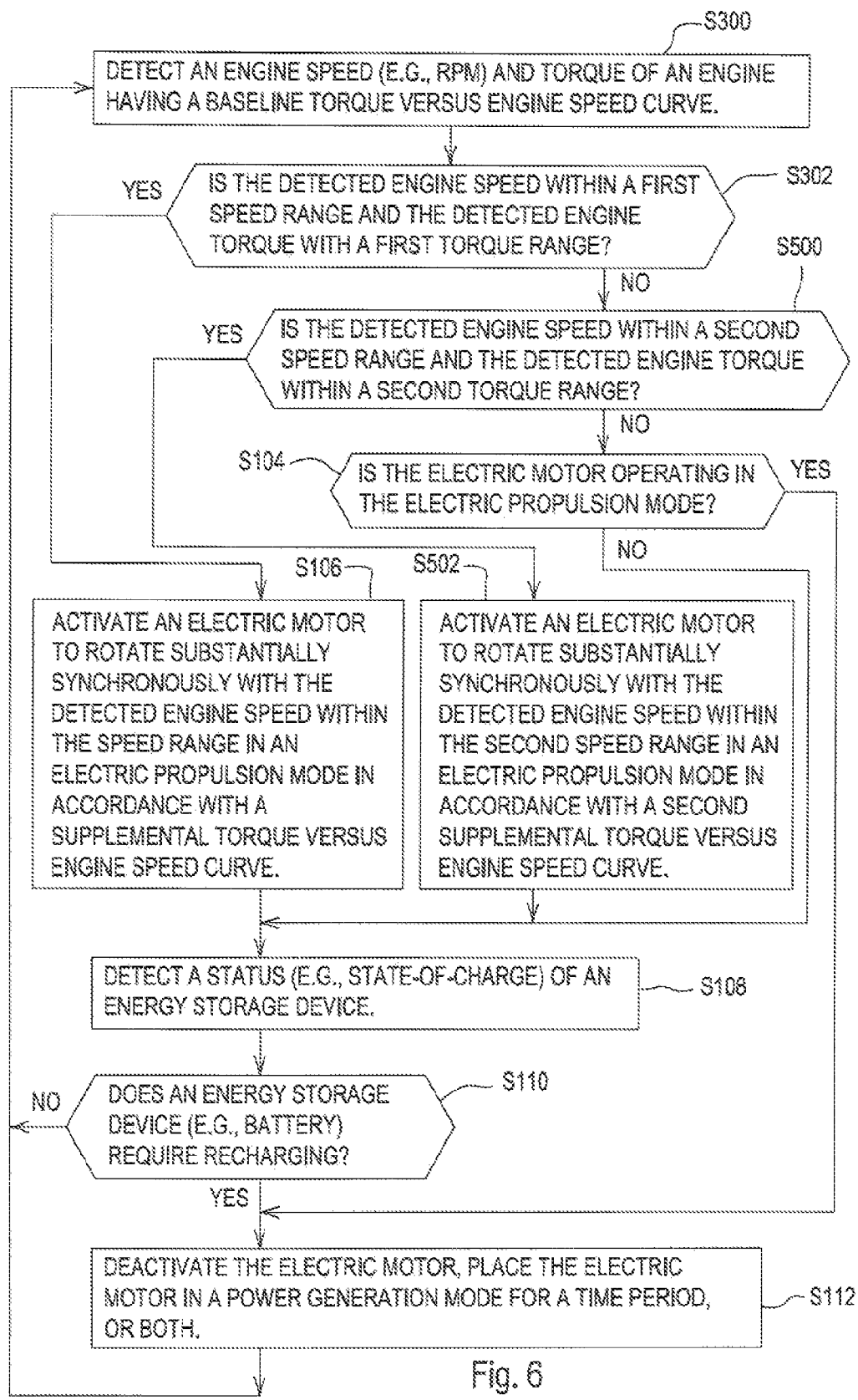
FIG. 6 is a flow chart of a fourth embodiment of a method for boosting torque output of a drive train.

The method of FIG. 6 is similar to the method of FIG. 5, except the method of FIG. 6 further includes step S500 and step S502. Like reference numbers in FIG. 5 and FIG. 6 indicate like elements or procedures.

Step S500 may follow step S302, if the detected engine speed is not within a first range or if the detected torque is not within a first range. In step S500, the data processor 14 or evaluator 15 determines if the detected engine speed is within a second speed range and if the detected engine torque is within a second torque range. If the detected engine speed is within the second speed range and if the detected engine torque is within the second torque range, the method continues with step S502. However, if the detected engine speed is not within the second speed range or if the detected engine torque is not within the second torque range, the method continues with step S104.

In step S502, the motor controller 28, the data processor 14 or both activates an electric motor (e.g., the electric motor/generator 24) to rotate substantially synchronously with the detected engine speed within the second speed range in accordance with a second supplemental torque versus engine speed curve.

Figure 7:
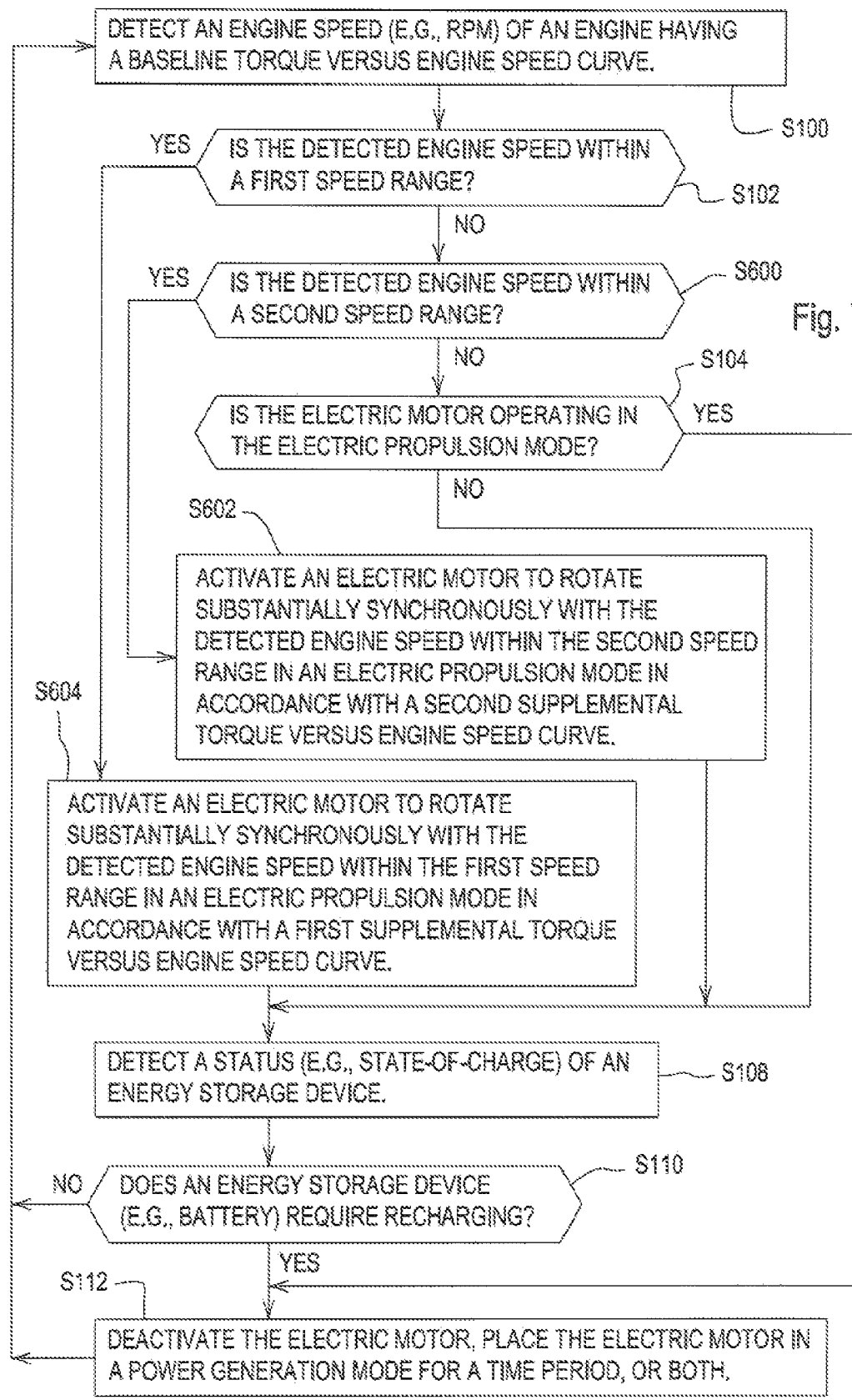
FIG. 7 is a flow chart of a fifth embodiment of a method for boosting torque output of a drive train.

The method of FIG. 7 is similar to the method of FIG. 3, except the method of FIG. 7 considers multiple speed ranges, whereas the method of FIG. 3 only considers a first speed range. Like reference numbers in FIG. 3 and FIG. 7 indicate like steps or procedures.

In step S100, an engine speed sensor 12 detects an engine speed (e.g., revolutions per unit time) of an engine 10 having a baseline torque versus engine speed curve (e.g., baseline torque curve).

In step S102, the data processor 14 determines whether the detected engine speed of the engine 10 is within a first speed range. If the detected engine speed is within the first speed range, the method continues with step S604. However, if the detected engine speed is not within the first speed range, the method continues with step S600.

Figure 10:
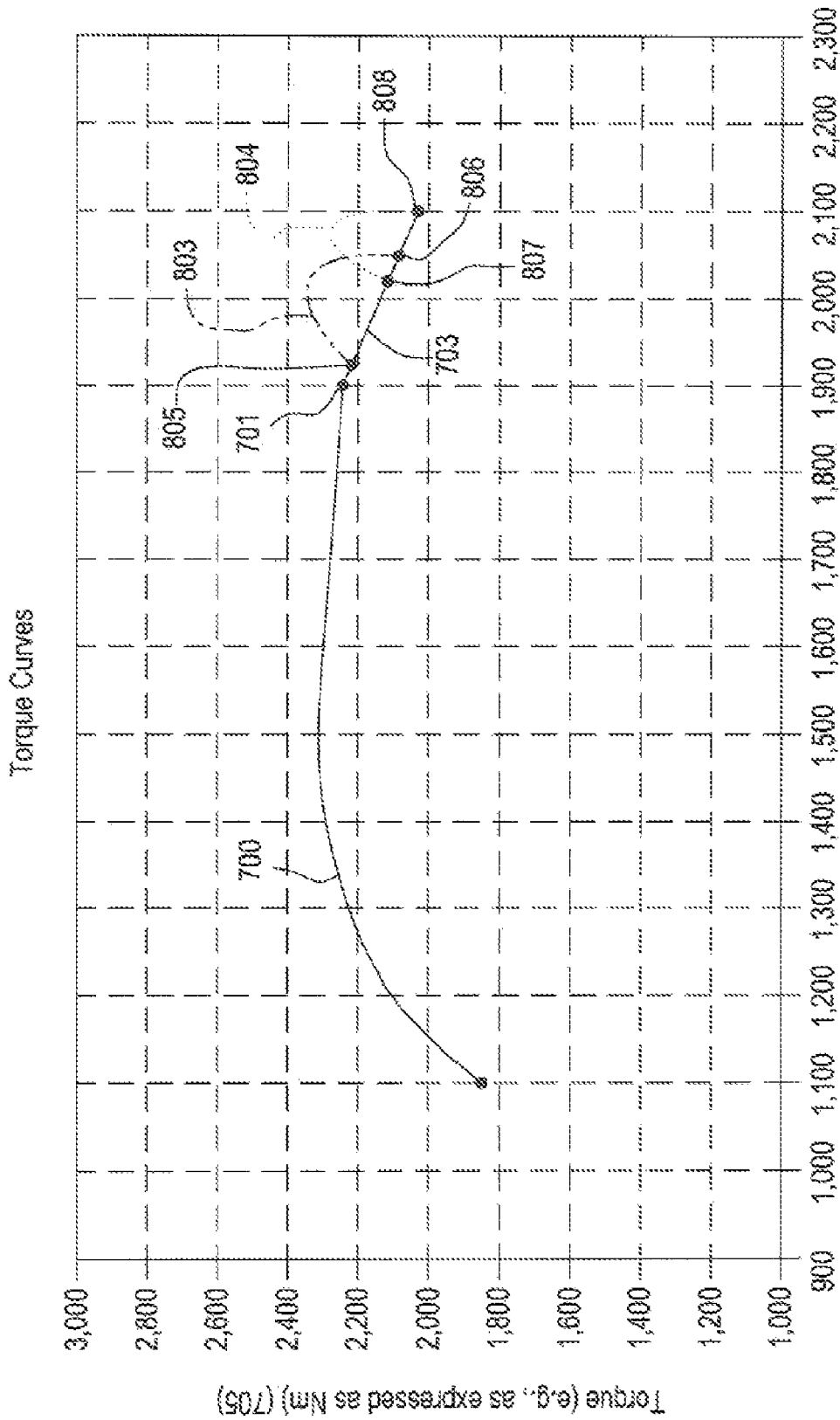
FIG. 10 is a diagram of a baseline torque curve and group of supplemental torque curves.

In step S604, the data processor 14, the motor controller 28, or both activate an electric motor of the electric motor/generator 24 to rotate substantially synchronously with the detected engine speed within the first speed range in an electric propulsion mode in accordance with a first supplemental torque versus engine speed curve (e.g., first supplemental curve 803 of FIG. 10). In one embodiment, the data processor 14 or the motor controller 28 only permits transitions between the baseline torque curve and the first supplemental torque versus engine speed curve at two or more discrete operating points (torque versus speed points.) For example, the data processor 14 or the motor controller 28 permits transitions between the baseline torque curve and the first supplemental torque versus engine speed curve a first lower speed point and a first higher speed point. Accordingly, the transitions may be matched for speed alignment, torque alignment, or both between the engine 10 and the electric motor/generator 24 to reduce thermal and mechanical stress.

In step S600, the data processor 14 determines if the detected engine speed of the engine 10 is within a second speed range. If the detected engine speed is within a second speed range, the method continues with step S602. However, if the detected engine speed is not within the second speed range, the method continues with step S104.

In step S602, the data processor 14, the motor controller 28, or both activate an electric motor of the electric motor/generator 24 to rotate substantially synchronously with the detected engine speed within the second speed range in an electric propulsion mode in accordance with a second supplemental torque versus engine speed curve (e.g., second supplemental curve 804 of FIG. 10). In one embodiment, the data processor 14 or the motor controller 28 only permits transitions between the baseline torque curve and the second supplemental torque versus engine speed curve at two or more discrete operating points (torque versus speed points). For example, the data processor 14 or the motor controller 28 permits transitions between the baseline torque curve and the second supplemental torque versus engine speed curve a second lower speed point and a second higher speed point, which are distinct from the first lower speed point and the first higher speed point. Accordingly, the transitions may be matched for speed alignment, torque alignment, or both between the engine 10 and the electric motor/generator 24 to reduce thermal and mechanical stress.

Step S104 may follow step S600, as indicate above. In step S104, the data processor 14 or motor controller 28 indicates whether the electric motor of the electric motor/generator 24 is operating in the electric propulsion mode. If the electric motor is operating in the electric propulsion mode, the method continues with step S112. However, if the electric motor/generator 24 is not operating in the electric propulsion mode, the method continues with step S108.

Step S108 follows after step S604, and may follow after step S104 or S602, depending upon whether certain conditions are satisfied, as previously noted. For example, when the status detector 32 may determine if the energy storage device 26 is fully charged, discharged, or in an intermediate state of charge. In step S108, a status detector 32 (e.g., state-of-charge detector) detects a status (e.g., state-of-charge (SOC)) of the energy storage device 26.

In step S10, the data processor 14 of the status detector 32 determines whether or not an energy storage device 26 (e.g., battery) requires recharging. For example, the energy storage device 26 may require recharging if it falls below a certain threshold ratio or percentage of a full charge. If the energy storage device 26 requires recharging, the method continues with step S112. However, if the energy storage device 26 does not require recharging, the method returns to step S100.

In step S112, the motor controller 28 or the data processor 14 deactivates the electric motor of the electric motor/generator 24, places the electric motor of the electric motor/generator 24 in a power generation mode for a time period, or both. In other words, the motor controller 28 or the data processor 14(a) deactivates electric propulsion mode or the electrically assisted mode, or (b) places the generator of the electric/motor generator 24 into a power generation mode. The electric motor/generator 24 may be deactivated to prevent further discharging of the energy storage device 26, for example. In the power generation mode, the generator of the electric motor/generator 24 is active and converts mechanical rotational energy into electrical energy. In general, the electric motor/generator 24 may not generate electrical energy at the same time it functions as an electric motor.

Although the method of FIG. 7 uses a first supplemental torque versus engine speed curve and a second supplemental torque versus engine speed curve, in an alternate embodiment any number of supplemental torque versus engine speed curves may be used in practice to supplement the baseline torque versus engine speed curve over a certain range.

Figure 8:
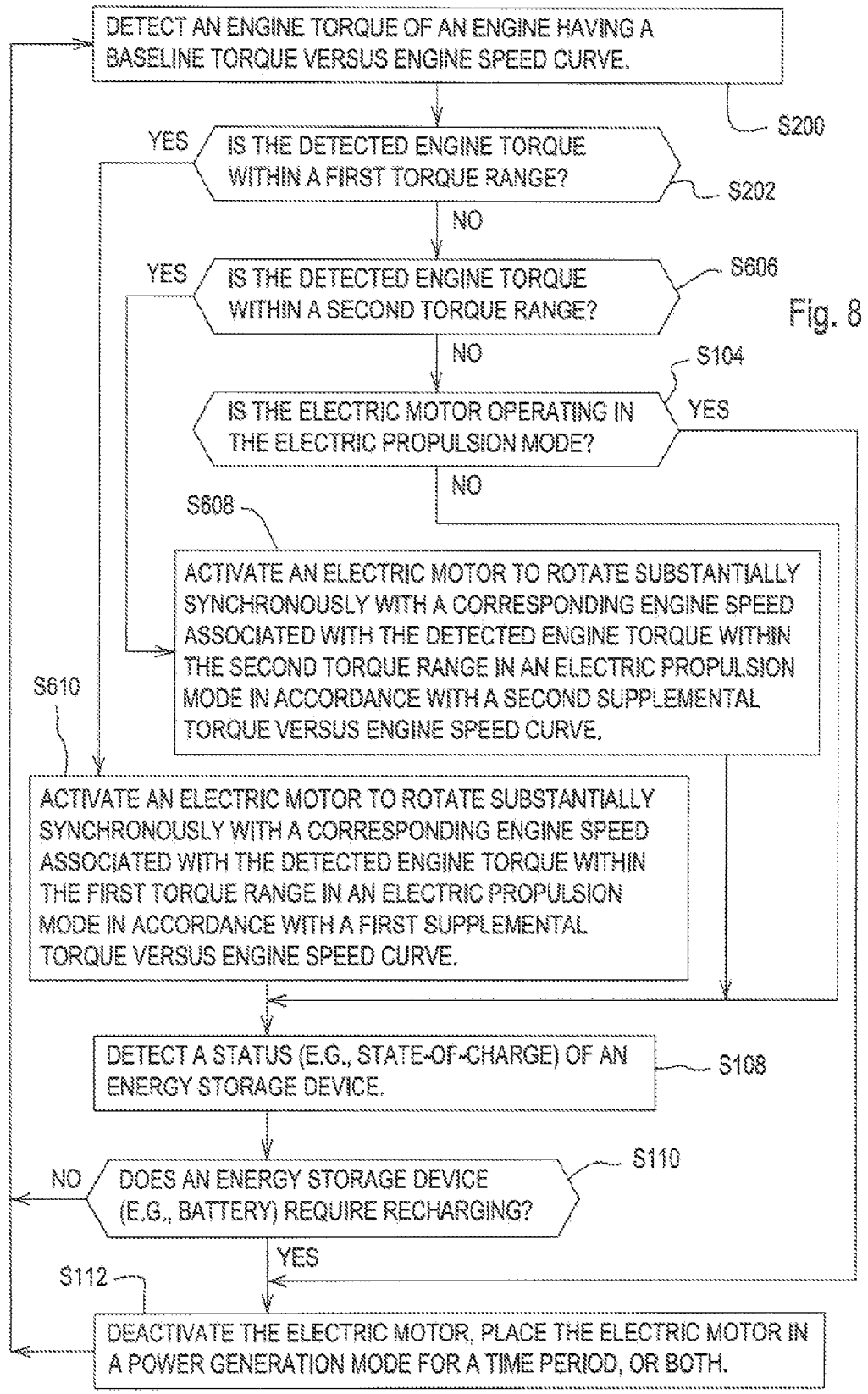
FIG. 8 is a flow chart of a sixth embodiment of a method for boosting torque output of a drive train.

The method of FIG. 8 is similar to that of FIG. 7, except torque measurements are used rather than speed measurements to control the boosting of torque. Like reference numbers in FIG. 8 and any other drawings indicate like elements.

In step S200, a torque sensor 30 detects an engine torque of an engine 10 having a baseline torque versus engine speed curve (e.g., baseline torque curve).

In step S202, the data processor 14 determines whether the detected engine torque of the engine 10 is within a first torque range. If the detected engine torque is within the first torque range, the method continues with step S610. However, if the detected torque speed is not within the first torque range, the method continues with step S606.

In step S610, the data processor 14, the motor controller 28, or both activate an electric motor of the electric motor/generator 24 to rotate substantially synchronously with a corresponding engine speed associated with the detected engine torque within the first torque range in an electric propulsion mode in accordance with a first supplemental torque versus engine speed curve (e.g., first supplemental curve 803 of FIG. 10). In one embodiment, the data processor 14 or the motor controller 28 only permits transitions between the baseline torque curve and the first supplemental torque versus engine speed curve at two or more discrete operating points (torque versus speed points.) For example, the data processor 14 or the motor controller 28 permits transitions between the baseline torque curve and the first supplemental torque versus engine speed curve a first lower speed point and a first higher speed point. Accordingly, the transitions may be matched for speed alignment, torque alignment, or both between the engine 10 and the electric motor/generator 24 to reduce thermal and mechanical stress.

In step S606, the data processor 14 determines if the detected engine torque of the engine 10 is within a second torque range. If the detected engine torque is within a second torque range, the method continues with step S608. However, if the detected engine torque is not within the second torque range, the method continues with step S104.

In step S608, the data processor 14, the motor controller 28, or both activate an electric motor of the electric motor/generator 24 to rotate substantially synchronously with a corresponding engine speed associated with the detected engine torque within the second torque range in an electric propulsion mode in accordance with a second supplemental torque versus engine speed curve (e.g., second supplemental curve 804 of FIG. 10). In one embodiment, the data processor 14 or the motor controller 28 only permits transitions between the baseline torque curve and the second supplemental torque versus engine speed curve at two or more discrete operating points (torque versus speed points). For example, the data processor 14 or the motor controller 28 permits transitions between the baseline torque curve and the second supplemental torque versus engine speed curve a second lower speed point and a second higher speed point, which are distinct from the first lower speed point and the first higher speed point. Accordingly, the transitions may be matched for speed alignment, torque alignment, or both between the engine 10 and the electric motor/generator 24 to reduce thermal and mechanical stress.

Step S104 may follow step S606, as indicate above. In step S104, the data processor 14 or motor controller 28 indicates whether the electric motor of the electric motor/generator 24 is operating in the electric propulsion mode. If the electric motor is operating in the electric propulsion mode, the method continues with step S112. However, if the electric motor/generator 24 is not operating in the electric propulsion mode, the method continues with step S108.

Step S108 follows after step S604, and may follow after step S104 or S602, depending upon whether certain conditions are satisfied, as previously noted. For example, when the status detector 32 may determine if the energy storage device 26 is fully charged, discharged, or in an intermediate state of charge. In step S108, a status detector 32 (e.g., state-of-charge detector) detects a status (e.g., state-of-charge (SOC)) of the energy storage device 26.

In step S110, the data processor 14 of the status detector 32 determines whether or not an energy storage device 26 (e.g., battery) requires recharging. For example, the energy storage device 26 may require recharging if it falls below a certain threshold ratio or percentage of a full charge. If the energy storage device 26 requires recharging, the method continues with step S112. However, if the energy storage device 26 does not require recharging, the method returns to step S100.

In step S112, the motor controller 28 or the data processor 14 deactivates the electric motor of the electric motor/generator 24, places the electric motor of the electric motor/generator 24 in a power generation mode for a time period, or both. In other words, the motor controller 28 or the data processor 14(a) deactivates electric propulsion mode or the electrically assisted mode, or (b) places the generator of the electric/motor generator 24 into a power generation mode. The electric motor/generator 24 may be deactivated to prevent further discharging of the energy storage device 26, for example. In the power generation mode, the generator of the electric motor/generator 24 is active and converts mechanical rotational energy into electrical energy. In general, the electric motor/generator 24 may not generate electrical energy at the same time it functions as an electric motor.

Although the method of FIG. 8 uses a first supplemental torque versus engine speed curve and a second supplemental torque versus engine speed curve, in an alternate embodiment any number of supplemental torque versus engine speed curves may be used in practice to supplement the baseline torque versus engine speed curve over a certain range.

FIG. 9 is an illustrative graph of torque versus engine speed associated with any system (11 or 111) or method disclosed herein. The torque versus engine speed curve comprises a baseline torque versus engine speed curve (hereinafter "baseline curve") 700 and a supplemental torque versus engine speed curve 702 (hereinafter "supplemental curve"). The baseline curve 700 is shown as a solid line, whereas the supplemental curve 702 is shown as a dashed line. The vertical axis 705 of FIG. 9 represents torque (e.g., expressed in Newton-meters (NM)). The horizontal axis 706 represents engine speed (e.g., expressed in revolutions per minute (RPM)).

The baseline curve 700 features an inflection point 701, which pertains to a certain engine speed (e.g., 1900 RPM) and indicates a boundary of a declining or decreased torque region 703. The declining or decreased torque region 703 pertains to the torque of the engine 10 without any assistance or propulsion from the electric motor/generator 24. The electric motor/generator 24 enhances or increases the torque over the decreased torque region 703 to the supplemental curve 702 via electric propulsion or electrically assisted propulsion.

The supplemental curve 702 represents the aggregate or cumulative torque of the engine 10 and the electric motor of the electric motor/generator 24 assisting propulsion. The supplemental curve 702 intersects the baseline curve 700 (or the decreased torque region 703 of the baseline curve 700) at a lower speed point 704 (or lower speed point) and an higher speed point 705 (or higher speed point). The transition between the internal combustion propulsion mode and the electrically assisted internal combustion mode may be made at the lower speed point 704 or the higher speed point 705. For example, the data processor 14 may restrict transitions between the internal combustion propulsion mode and the electrically assisted combustion mode to the lower speed point 704 and the higher speed point 705 to facilitate matching of engine speed (of the engine 10) to motor speed (of the electric motor/generator 24) and alignment of engine torque (of the engine 10) to motor torque (of the electric motor/generator 24). Thermal loss and stress in the electric motor/generator 24 from the potential speed misalignment (between engine speed and motor control speed) and/or potential torque misalignment (between engine torque and motor torque) are reduced by restricting transitions between the internal combustion propulsion mode and the electrically assisted combustion mode to the lower speed point 704 and the higher speed point 705, where the torque/speed operating point parameters are generally known.

FIG. 10 is an illustrative graph of torque versus engine speed associated with any system (11 or 111) or method disclosed herein. The torque versus engine speed curve is an illustrate graph of a baseline torque versus engine speed curve (hereinafter "baseline curve") 700 and supplemental torque versus engine speed curves (803, 804) (hereinafter "supplemental curve"). The baseline curve 700 is shown as a solid line. A first supplemental curve 803 is illustrated by a dashed line. A second supplemental curve 804 is illustrated by a dotted line, The vertical axis 705 of FIG. 10 represents torque (e.g., expressed in Newton-meters (NM)), whereas the horizontal axis 706 represents engine speed (e.g., expressed in revolutions per minute (RPM)). The baseline curve 700 is represented by the solid line and features an inflection point 701, which pertains to a certain engine speed (e.g., 1900 RPM) and indicates a boundary of a declining or decreased torque region 703. The declining or decreased torque region 703 pertains to the torque of the engine 10 without any assistance or propulsion from the electric motor/generator 24. The electric motor/generator 24 enhances or increases the torque over the decreased torque region 703 to the first supplemental curve 803, the second supplemental curve 804, or both via electric propulsion or electrically assisted propulsion.

Here, a first supplemental curve 803 enhances or increases the torque over a portion of the decreased torque region 703 via electric propulsion. The first supplemental curve 803 intersects the baseline curve 700 (or the decreased torque region 703 of the baseline curve 700) at a lower speed point 704 and an higher speed point 705. The transition between the internal combustion propulsion mode of the baseline curve 700 and the electrically assisted internal combustion mode of the first supplemental curve 803 may be made at a first lower speed point 805 or the first higher speed point 702, for example.

A second supplemental curve 804 enhances or increases the torque over a portion of the decreased torque region 703 via electric propulsion. The second supplemental curve 804 intersects the baseline curve 700 (or the decreased torque region 703 of the baseline curve 700) at a second lower speed point 807 and a second higher speed point 808. The transition between the internal combustion propulsion mode of the baseline curve 700 and the electrically assisted internal combustion mode of the second supplemental curve 804 may be made at a second lower speed point 807 or the second higher speed point 808, for example.

The data processor 14 may restrict transitions between the internal combustion propulsion mode and the electrically assisted combustion mode to the first lower speed point 805, the first higher speed point 806, the second lower speed point 807 and the second higher speed point 808 to facilitate matching of engine speed (of the engine 10) to motor speed (of the electric motor/generator 24) and alignment of engine torque (of the engine 10) to motor torque (of the electric motor/generator 24). Thermal loss and stress in the electric motor/generator 24 from the potential speed misalignment (between engine speed and motor control speed) and/or potential torque misalignment (between engine torque and motor torque) are reduced by restricting transitions between the internal combustion propulsion mode and the electrically assisted combustion mode to the first lower speed point 805, the first higher speed point 806, the second lower speed point 807 and the second higher speed point 808, where the torque/speed operating point parameters are generally known.

Having described the preferred embodiment, it will become apparent that various modifications can be made without departing from the scope of the invention as defined in the accompanying claims.

The invention claimed is:

1. A system for boosting a torque output of a drive train, the system comprising:
   an engine speed detector for detecting an engine speed of an engine having a baseline torque versus engine speed curve;
   a torque sensor for detecting an engine torque of the engine;
   a data processor for determining if the detected engine speed is within a first speed range and if the detected engine torque is within a first torque range; and
   a motor controller for activating an electric motor to rotate substantially synchronously with a corresponding engine speed associated with the detected engine torque within the first range in an electric propulsion mode in accordance with a supplemental torque versus engine speed curve if the detected engine speed is within the first speed range if the detected engine torque is within the first torque range, the supplemental torque versus engine speed curve intercepting the baseline torque versus engine speed curve at a lower speed point and a higher speed point.

2. The system according to claim 1 wherein the motor controller and the data processor are arranged to permit a transition between the baseline torque versus engine speed curve and the supplemental torque versus engine speed curve only at the first lower speed point and the first higher speed point.

3. The system according to claim 1 wherein the supplemental torque versus engine speed curve is generally parabolic and has an enhanced peak torque between the lower speed point and the higher speed point.

4. The system according to claim 1 wherein the enhanced peak torque exceeds the baseline torque at any engine speed.

5. The system according to claim 1 further comprising:
   a status detector for determining if a state of charge of an energy storage device indicates that the energy storage device requires recharging; and
   the motor controller arranged to deactivate the electric motor for a time period if the stage of charge indicates that the energy storage device requires recharging.

6. The system according to claim 1 further comprising:
   the data processor arranged to determine if a state of charge of an energy storage device indicates that the energy storage device requires recharging; and
   the motor controller configured to place the electric motor in a power generation mode for a time period, rather than the electric propulsion mode.

7. The system according to claim 1 further comprising:
   the data processor arranged to determine if the detected engine speed is within a second speed range and if the detected torque is within the second torque range; and
   the motor controller configured to activate an electric motor to rotate substantially synchronously with the engine speed within the second range in an electric propulsion mode in accordance with a second supplemental torque versus engine speed curve if the detected engine speed is within the second speed range and if the detected torque is within the second torque range, the second supplemental torque versus engine speed curve intercepting the baseline torque versus engine speed curve at a second lower speed point and a second higher speed point.

8. The system according to claim 7 wherein the motor controller and the data processor are arranged to permit a transition between the baseline torque versus engine speed curve and the supplemental torque versus engine speed curve only at the second lower speed point and the second higher speed point.

9. The system according to claim 1 wherein the torque sensor is configured to detect the engine torque during deactivating of the electric motor.

10. The system according to claim 1 wherein the torque sensor is configured to detect the engine torque while the electric motor is in an active state and, wherein the data processor is programmed to deduct a torque contribution of the electric motor from an aggregate torque based on the baseline torque versus engine speed curve and the supplemental torque versus engine speed curve at an applicable operating point.

* * * * *